United States Patent
Wattonville et al.

[11] Patent Number: 5,964,300
[45] Date of Patent: Oct. 12, 1999

[54] WEAR SHIN FOR A TILLAGE IMPLEMENT

[75] Inventors: Jason Daniel Wattonville, Maxwell; Paul David Parker, Ankeny, both of Iowa

[73] Assignee: Deere & Company, Moline, Ill.

[21] Appl. No.: 08/955,665

[22] Filed: Oct. 22, 1997

Related U.S. Application Data

[63] Continuation-in-part of application No. 08/734,936, Oct. 22, 1996, Pat. No. 5,797,460.

[51] Int. Cl.[6] .............................. A01B 13/08; A01B 15/00
[52] U.S. Cl. ......................... 172/700; 172/719; 172/772.5
[58] Field of Search ..................................... 172/719, 700, 172/772, 772.5

[56] References Cited

U.S. PATENT DOCUMENTS

| | | | |
|---|---|---|---|
| 838,411 | 12/1906 | Horne | 172/700 X |
| 3,001,591 | 9/1961 | Johnson | 172/700 |
| 3,171,500 | 3/1965 | Dils, Jr. | 172/700 |
| 3,254,726 | 6/1966 | Ratkowski | 172/700 |
| 3,254,727 | 6/1966 | Helton et al. | 172/719 |
| 3,387,668 | 6/1968 | Mathers | 172/700 X |
| 3,536,147 | 10/1970 | Norton et al. | 172/719 |
| 4,129,934 | 12/1978 | Gettman | 29/427 |
| 4,132,181 | 1/1979 | Smith et al. | 172/719 X |
| 4,548,276 | 10/1985 | Linger | 172/772.5 X |
| 4,799,823 | 1/1989 | Williams | 172/772 X |
| 5,119,888 | 6/1992 | Hall | 172/772.5 X |
| 5,333,696 | 8/1994 | Cornelius | 172/719 X |

FOREIGN PATENT DOCUMENTS 2031252  4/1980  United Kingdom ................. 172/700

*Primary Examiner*—Christopher J. Novosad

[57] ABSTRACT

A wear shin for a shank of a tillage tool such as a ripper includes a profile having a narrow leading edge with forwardly concave sides extending rearwardly and outwardly from the leading edge to sides generally aligned with the sides of the shank. Upper and lower ears extend on opposite sides of the upper and lower portions of the shank, and fasteners extend through the ears and shank to releasably secure the shin to the leading edge of the shank. The shin has a narrow profile with width approximately equal to the width of the shank other than at the connecting ears. The narrow leading edge of the shin provides good soil shearing characteristics so the implement slices through the soil, while the forwardly concave sides provide an increasing rate of soil deflection in the rearward direction for better wear, better soil and trash deflection characteristics, and reduced draft requirements.

13 Claims, 5 Drawing Sheets

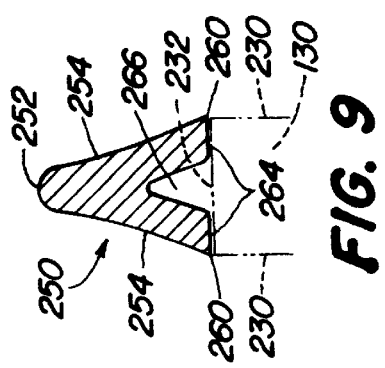
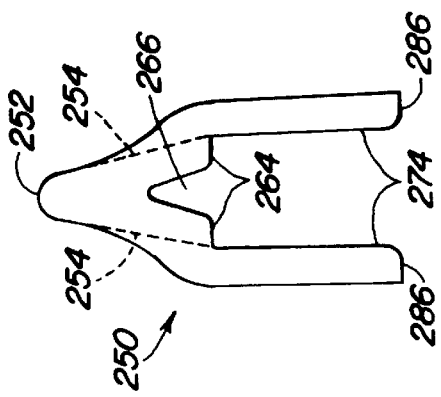
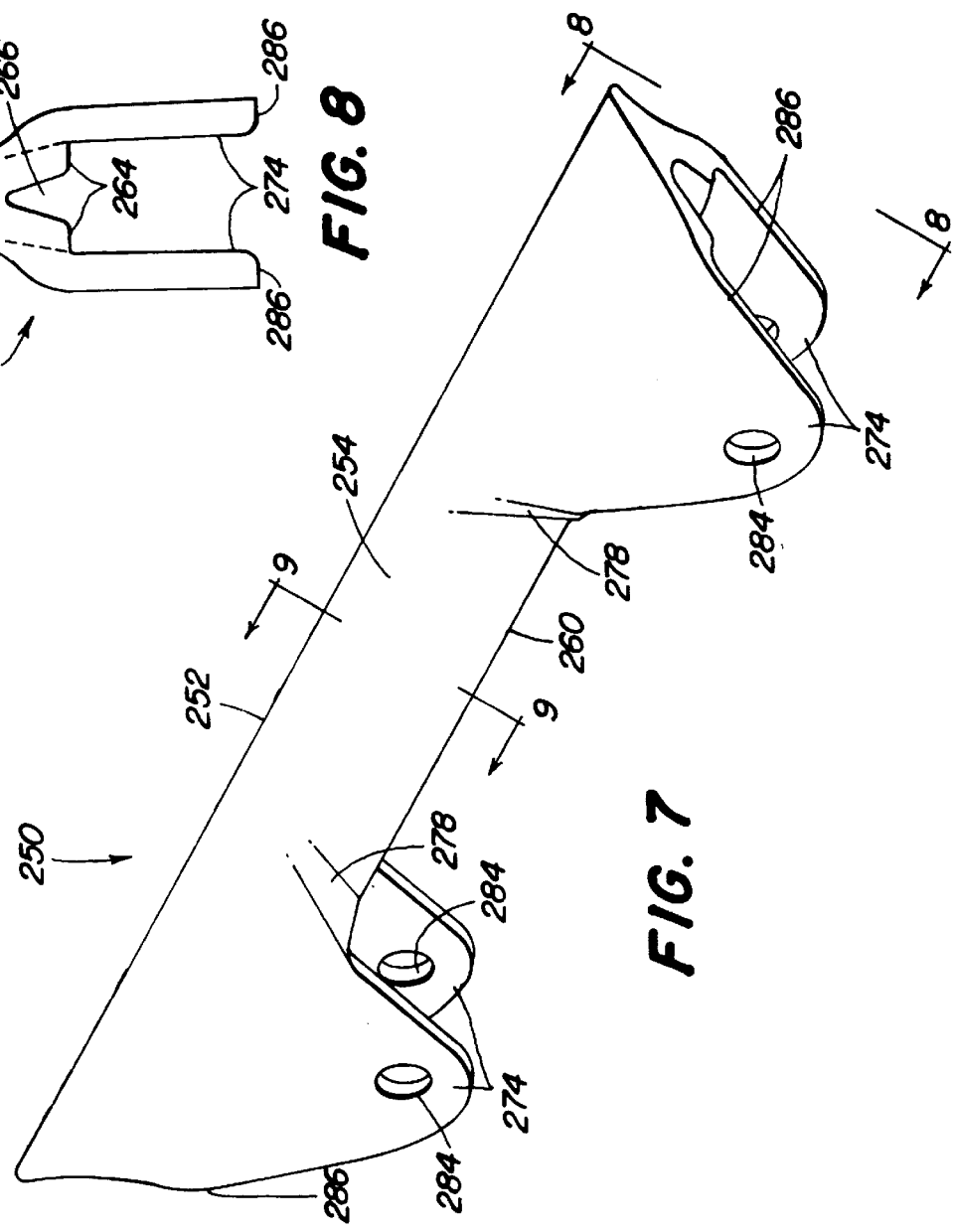

WEAR SHIN FOR A TILLAGE IMPLEMENT

CROSS-REFERENCE TO RELATED APPLICATIONS

This is a Continuation-In-Part of application Ser. No. 08/734,936, filed Oct. 22, 1996, now U.S. Pat. No. 5,797,460 and entitled STRAIGHT BAR TILLAGE IMPLEMENT.

BACKGROUND OF THE INVENTION

1) Field of the Invention

The present invention relates generally to agricultural earthworking implements, and, more specifically, to a wear shin for an implement such as a deep tillage ripper.

2) Related Art

Many different forms of conservation tillage practices are emerging which involve leaving plant residue on the surface of the ground to preserve top soil. In one of these forms, referred to as strip tillage, a strip of soil where crop will be planted is tilled and crop residue or a cover crop is left between the tilled strips. Typically, strip till machines utilize a combination of fluted coulters to help till the soil and a rolling basket to break clods. Strip tillage is often combined with a toolbar mounted ripper or subsoiler to break through compacted layers of soil, and the coulters are angled to throw soil inwardly over the slot formed by the ripper. The coulters in some machines are mounted on a simple swing arm which floats vertically.

The ripper or subsoiler tool typically includes an upright shank having a relatively narrow profile with a lower end supporting a deep tillage point or tooth. The leading edge of the shank is subject to very high wear forces from soil and trash flow as the implement moves forwardly through the soil. To reduce shank wear and damage, and to avoid costly and time consuming shank replacements, protective wear shins often are provided for the leading edge of the shank. With use, the shins wear down and then must be replaced. Wear life of the shins often is less than desired, particularly when the implement is operating in hard or highly abrasive soils. In addition, a typical wear shin can substantially increase ripper penetration and draft loads and result in need for a higher horsepower tractor for a given number of ripper tools. Some available shins and shin attaching structures present forward trash and soil contacting profile that is substantially increased over that of the shank alone. Most have planar type angled profiles that are inefficient for slicing and penetrating the soil and for moving trash and soil towards the sides of the shank.

BRIEF SUMMARY OF THE INVENTION

It is therefore an object of the present invention to provide an improved wear shin for a tillage implement. It is a further object to provide such a wear shin that overcomes most or all of the above-mentioned problems.

It is another object to provide an improved wear shin for the leading edge of an upright deep ripper shank. It is a further object to provide such a shin that has a wear life substantially increased over that of most available shins. It is still another object to provide such a shin that is easily replaceable.

It is another object of the present invention to provide an improved wear shin for a tillage implement that has better trash and soil flow characteristics and has reduced penetration and draft force requirements when compared with at least most previously available wear shins. It is yet another object to provide such a shin which wears substantially longer than most previously available shins.

A wear shin for a shank of a tillage tool such as a ripper includes a profile having a narrow leading edge with forwardly concave sides extending rearwardly and outwardly from the leading edge to sides generally aligned with the sides of the shank. Upper and lower ears extend on opposite sides of the upper and lower portions of the shank, and fasteners extend through the ears and shank to releasably secure the shin to the leading edge of the shank. The shin has a narrow profile with width approximately equal to the width of the shank other than at the connecting ears. The narrow leading edge of the shin provides good soil shearing characteristics so the implement slices through the soil, while the forwardly concave sides provide an increasing rate of soil deflection in the rearward direction for better soil and trash deflection characteristics and reduced draft requirements as compared to a straight V-shaped configuration. The configuration of the shin also improves wear life. The shin is fabricated from a high chrome cast alloy which further increases wear life. The shin is also symmetrical so that it may be reversed top to bottom on the shank for more uniform wear.

These and other objects, features and advantages of the present invention will become apparent to one skilled in the art upon reading the following detailed description in view of the drawings.

BRIEF DESCRIPTION OF THE DRAWINGS

FIG. 7 is an enlarged perspective view of the wear shin on the ripper standard assembly of FIG. 5.

FIG. 8 is end view of the wear shin of FIG. 7 taken substantially along lines 8—8.

FIG. 9 is a sectional view of the wear shin taken substantially along lines 9—9 of FIG. 7.

DETAILED DESCRIPTION OF THE DRAWINGS

Detailed Description of the Straight Bar Tillage Implement

Figure 1:
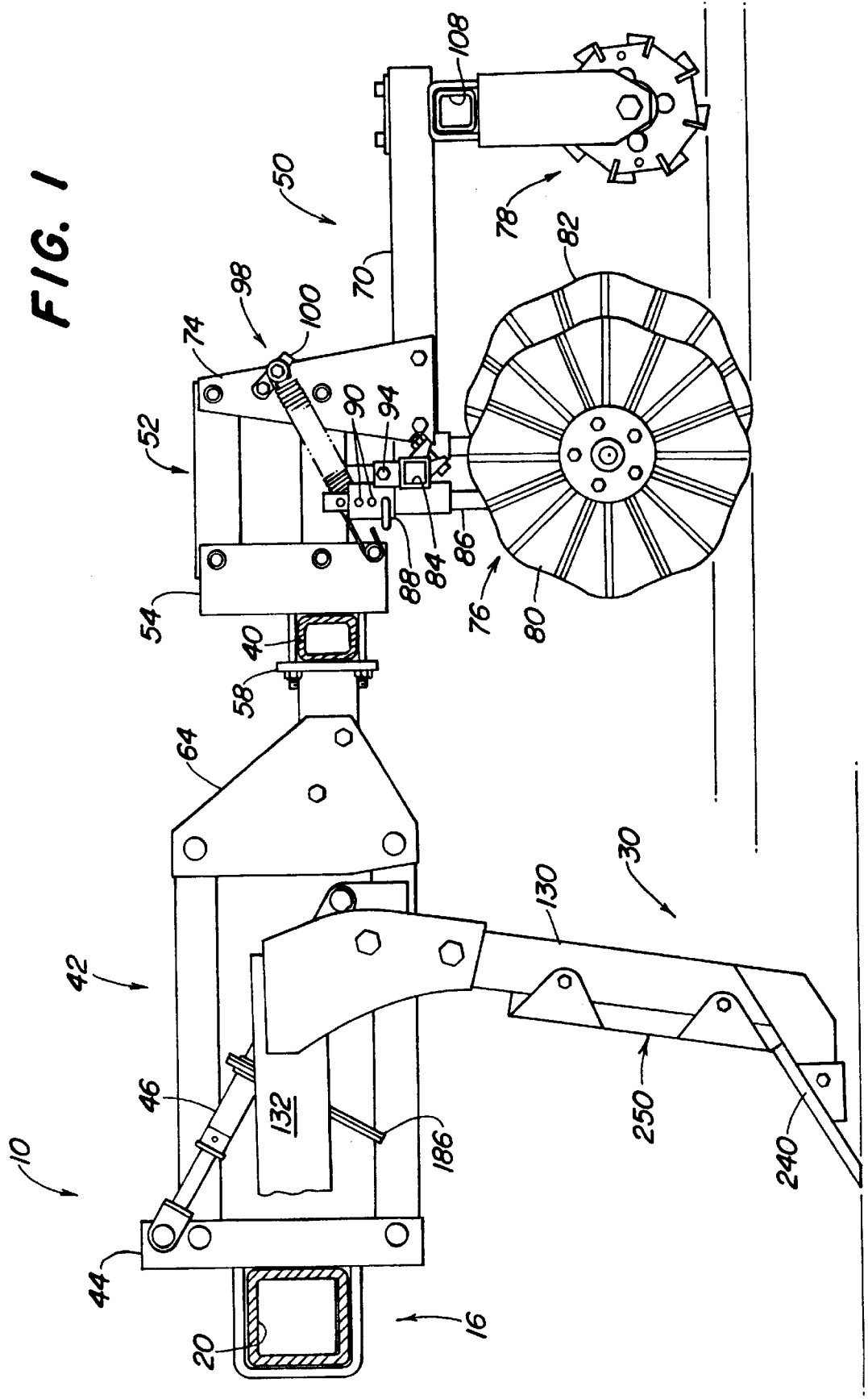
FIG. 1 is a side view of an implement having a toolbar with ripper standards and trailing strip till attachments connected to a secondary toolbar, with portions a ripper standard broken away to more clearly show the connection between the main and secondary toolbars.
Figure 2:
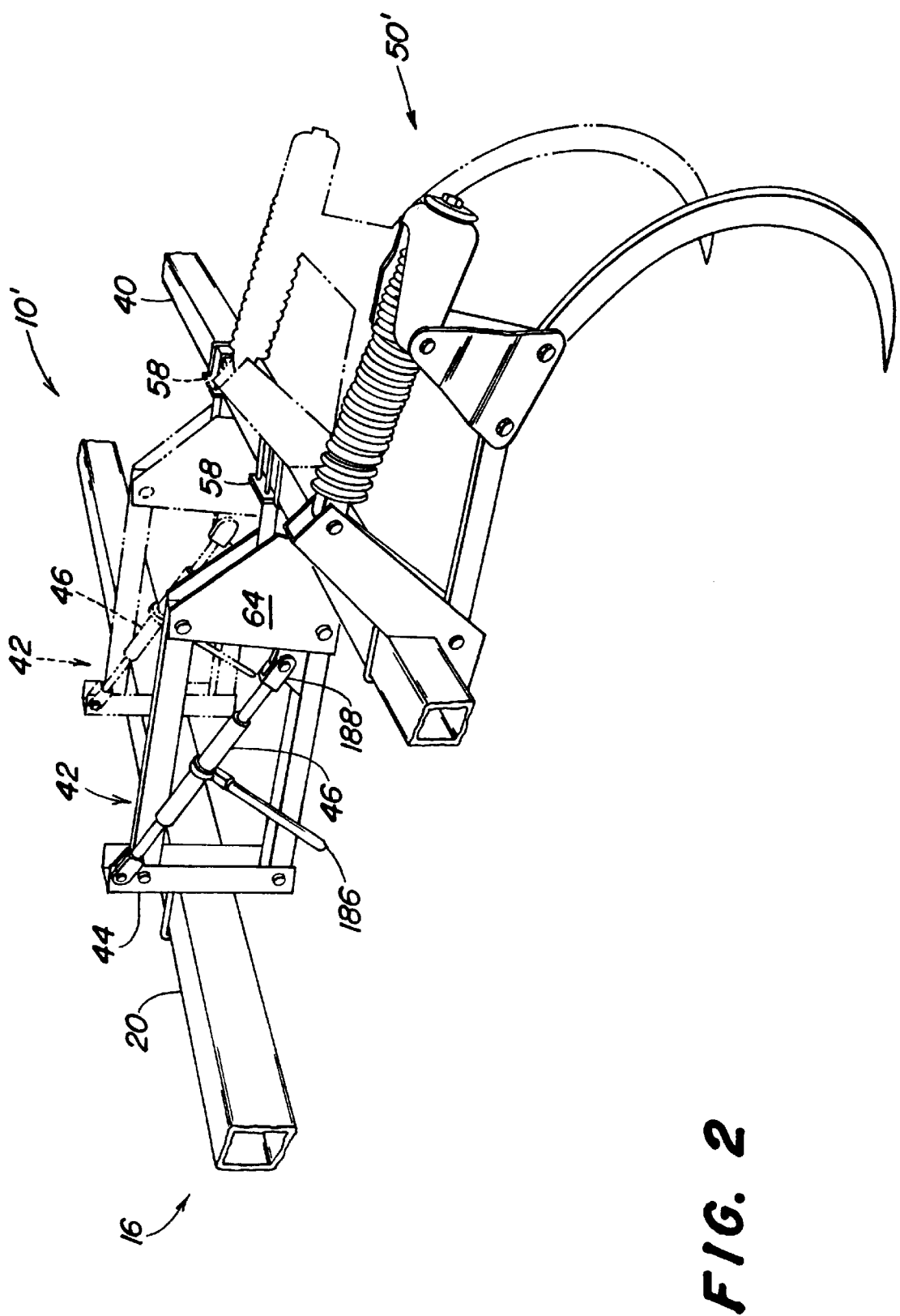
FIG. 2 is a rear perspective view of a rear portion of the implement of FIG. 1 but with the strip till attachments replaced by other tillage tools.
Figure 3:
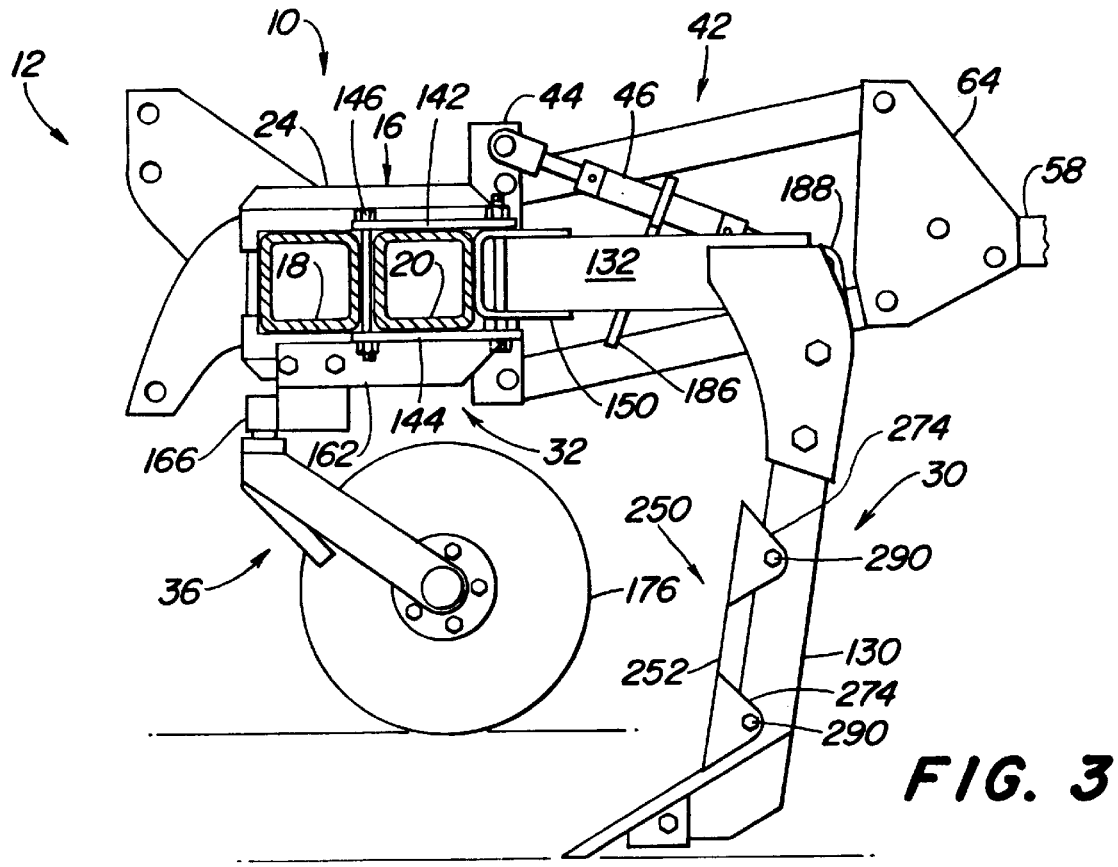
FIG. 3 is a side view of a portion of the implement of FIG. 1 with the secondary toolbar adjusted upwardly for deep ripper operation and further including a trash-sizing coulter mounted below the toolbar independently of a separate coulter mounting tube.
Figure 4:
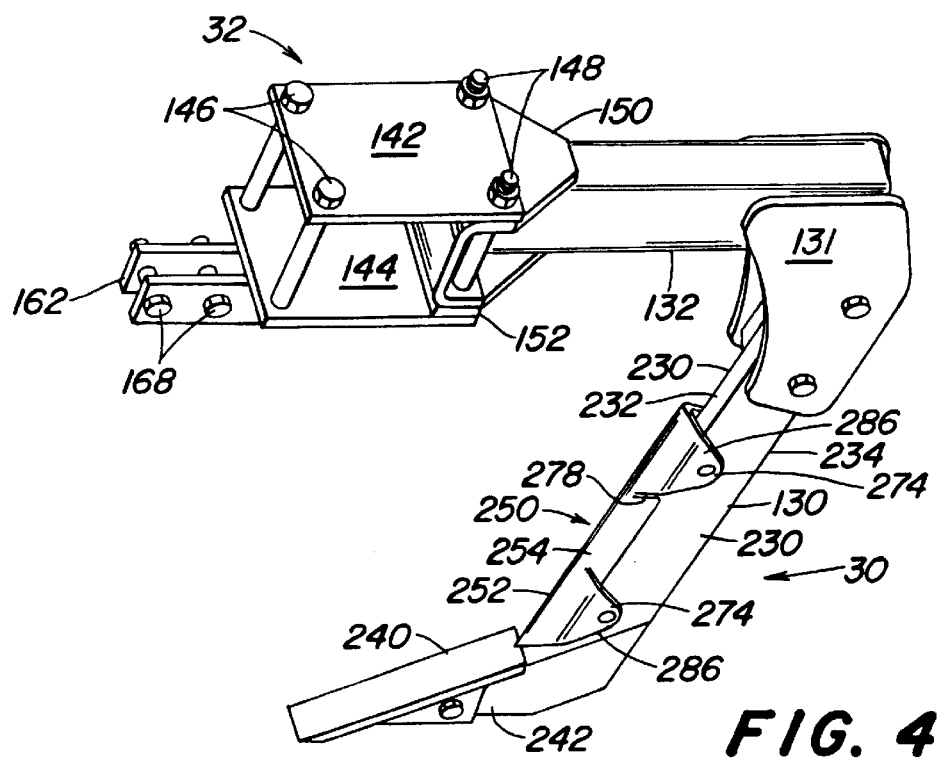
FIG. 4 is a top perspective view of the ripper standard assembly showing details of the ripper and coulter mounting bracket structure.
Figure 6:
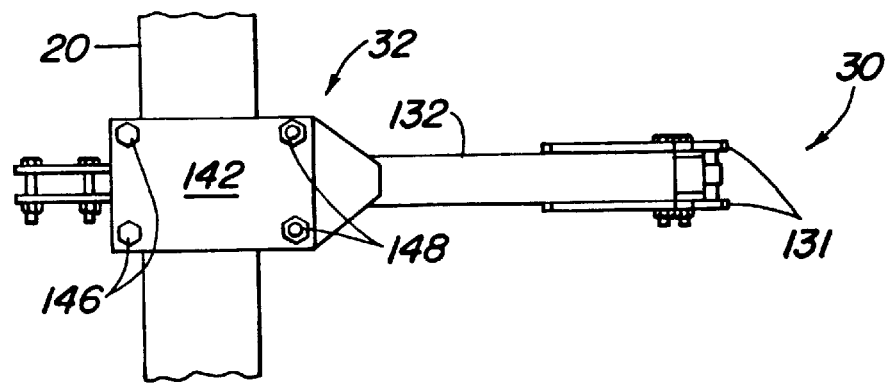
FIG. 6 is a top view of the ripper standard assembly of FIG. 5.

Referring now to FIGS. 1–3, therein is shown a tillage implement 10 including hitch structure 12 (FIG. 3) adapted for connection to a conventional three-point hitch (not shown) on a tractor. The hitch structure 12 supports frame or primary toolbar structure 16 at vertically adjustable positions for forward movement over the ground. The primary toolbar structure 16 includes a transversely extending hitch tube 18 connected to the hitch structure 12 and a longer tool-supporting main frame tube 20 connected in parallel and rearwardly offset fashion relative to the hitch tube 18 by brackets 24 spaced outwardly from the hitch structure 12.

A plurality of deep tillage tools 30 are connected to the main frame tube 20 at transversely spaced locations by bracket structure 32. Trash-sizing coulter structure 36 (FIG. 3) is selectively attachable directly to the bracket structure 32 independently of any separate coulter support tube or the like for operation under the primary toolbar structure 16. The bracket structure 32 is adjustable transversely on the frame tube 20 for varying the spacings of the tools 30.

Secondary or rear toolbar structure indicated generally at 40 in FIGS. 1 and 2 is adjustably supported from the primary toolbar structure 16 by parallel four-bar linkage structures 42 having forward upright brackets 44 mounted on the tube 20 between the bracket structures 32. An adjustable length member 46 on each of the structures 42 provides height adjustment of the secondary toolbar structure 40 relative to the main frame tube 20. Alternatively, the member 46 may be removed to allow the secondary toolbar structure 40 to float relative to the tube 20. The parallel bar linkage structures 42 maintain the toolbar structure 40 generally parallel to the forward toolbar 20 and at a preselected angular position relative to a transverse horizontal tube axis as the structure 40 is adjusted vertically or as the structure 40 floats vertically relative to the tube 20.

A plurality of rear mounted tillage tool supports or rigs 50 are connected to the secondary toolbar structure 40 by rear parallel four bar linkage structures 52 having forward upright brackets 54 secured at transversely spaced locations on the secondary toolbar structure 40 by U-bolts (not shown). The secondary toolbar structure 40 is connected by brackets 58 to aft plates 64 of the forward four bar linkages 42. As shown in FIG. 1, the rigs 50 are strip till rigs each having a main fore-and-aft extending tube 70 sandwiched between the lower ends of upright plates 74 of the corresponding four-bar linkage 52. A coulter assembly 76 is adjustably secured to the forward end of the tube 70 below the four bar linkage structure 52. A rolling basket or similar tool 78 is rotatably supported from the aft end of the tube 70 and is offset behind the coulter assembly 76 for breaking clods, incorporating chemicals and/or firming the soil in the bed.

The coulter assembly 76 includes transversely spaced fluted coulters 80 and 82 (FIG. 1) supported from a transverse tube 84 secured to the forward end of the tube 70. Upright shanks 86 are supported in brackets 88 which are apertured at 90 for vertical adjustment of the coulters relative to the tool 78. As can be appreciated from FIG. 1, once the shanks are adjusted, the four-bar linkage structures maintain the vertical relationship between the coulter assembly 76 and the basket 78 constant as the rig 50 floats. A screw arrangement 94 on each of the brackets 88 sets the shank 86 at the desired angular relationship relative to an upright axis for the desired attack angle. To change the attack angle of a coulter, the operator simply turns the screw 94. The coulter adjusting structure preferably is of the type shown and described in U.S. Pat. No. 4,738,316 which is of common ownership with the present application. An indicator operatively associated with the screw arrangement provides an indication of the attack angle. The four-bar linkage structure 52 retains the coulter assembly 76 in substantially the same attitude as the rig floats vertically so that the attack angle remains substantially constant. A spring assembly 98 with over-center toggle 100 provides adjustable rig down force settings. Two selectively attachable and removable spring assemblies 98, one on each side of the linkage structure 52 and each having two positions for the toggle 100, provide six distinct and easily changeable and repeatable down force settings. Preferably the coulters 80 and 82 operate on opposite sides of a slot formed by the leading tool 30 and throw soil over the slot. The coulters are set at an angle to the vertical and angle outwardly in the upward direction to throw more soil over the slot and provide a small bed. The basket 78, which preferably has a width approximately equal to the spacing between the coulters 80 and 82, is supported from a transversely extending tube 108 secured to the aft end of the tube 70.

The tillage tool 30 is shown as a ripper having a subsoiler shank 130 connected by a bracket and break-away bolt or shank connecting assembly 131 to the aft end of a horizontal leg 132 of rectangular cross section. The leg 132 has a forward end fixed to the bracket structure 32 and extends rearwardly from, and at a right angle to, the aft face of the main frame tube 20. The rearward offset provides ample space for the coulter assembly 36 directly under the frame tube 20. The plane of the bottom wall of the horizontal leg 132 is located above the plane of the bottom wall of the tube 20 for good trash clearance.

As shown in FIGS. 3–6, the bracket structure 32 includes upper and lower plates 142 and 144 adapted to embrace the top and bottom walls of the main frame tube 20. Forwardly and rearwardly located bolts 146 and 148 extend through apertures in the plates and are tightened to clamp the bracket structure 32 at any desired location along the tube 20. A rearwardly opening channel-shaped support 150 is welded to the forward end of the leg 132 and is secured between the bracket plates 142 and 144 by the rearward bolts 148. A spacer 152 is sandwiched between the lower forward portion of the support 150 and the aft end of the plate 144. A coulter bracket 162 connected to the bottom of the plate 144 has a coulter receiving end projecting forwardly and below the front face of the tube 20. A coulter support 166 is connected to the bracket 162 by bolts 168. A trash-sizing coulter 176 is rotatably mounted on the support 166 below the tube 20 and directly in line with the shank 130. The support 166 provides limiting castering action for the coulter 176. The aft edge of the coulter 176 is located below the forward end of the leg 132 (FIG. 3) and directly above the leading edge of the tool. The forward edge of the coulter 176 is located slightly forwardly of the leading face of the tube 20. As the bracket structures 32 are adjusted transversely on the tube 20 for the desired row spacings, the coulter 176 is automatically positioned in the proper location without need for additional adjustments. The offset provided between the tubes 18 and 20 by the brackets 24 facilitates transverse movement of the bolts 146 with the bracket structures 32 so the bolts do not have to be removed for most tool spacing adjustments. The transverse adjustability of the brackets 24 and 32 and linkages 42 and 52 easily accommodates virtually any desired tool spacings.

At least two four bar linkage structures 42 are transversely spaced on the main tube 20 for side to side stability of the rear toolbar structure 40. Additional structures 42 may be added depending on the loading presented by the rear mounted tools. For example, when tillage tools such as chisel plow standards 50' (FIG. 2) are mounted on the secondary toolbar structure 40 of an implement 10', three or more of the structures 42 may be provided. The linkage structures 42 are adjusted to the desired height by varying the length of the corresponding members 46, which preferably are ratchet members having a ratcheting handle 186. For a strip till machine, the members 46 may be adjusted so the average position of the rear four bar linkages 52 is substantially horizontal as shown in FIG. 1 during normal tillage operations. If the depth of the tools 30 is increased (i.e., the main frame tube 20 is lowered, the secondary toolbar structure 40 can be raised relative to the toolbar 20 by simply decreasing the length of the members 46 to raise the aft plates 64 (FIG. 3). The ends of each of the members 46 are connected by quick lock pins to the forward bracket 44 and to an upwardly projecting stop member 188 located near the aft pivot on the lower link of the linkage structure 42. The member 188 functions as a down stop limit in the float mode. As the linkage structure 42 pivots downwardly to a preselected lowermost position, the member 188 contacts the aft plate structure 64 to prevent further downward rocking, for example, when the implement 10 is lifted to the transport position.

To provide rear toolbar float when, for example, disk bedder and gauge wheel structures are mounted on the rear toolbar structure 40, the members 46 are ratcheted to a lengthened position so the stop members 188 contact the plate structure 64 and relieve pressure on the quick lock pins. The pins and the member 46 are then removed so the rear toolbar structure 40 floats and the gauge wheel structure maintains a preselected distance between the toolbar and the ground.

Detailed Description of the Wear Shin Structure

Referring to FIGS. 1 and 3–5 and 7–9, the wear shin structure will now be described in detail. The subsoiler shank 130 is upright and plate-like in construction with narrowly spaced side walls 230 connected by a straight leading edge 232 and a trailing edge 234. A deep tillage point of tooth 240 is connected to a forwardly projecting extension 242 at the lower end of the shank 130. A replaceable wear shin 250 is connected to the shank 130 and abuts and protects the straight leading edge 232 from a location directly above the tooth 240 to a location slightly below the shank connecting assembly 131.

Figure 5:
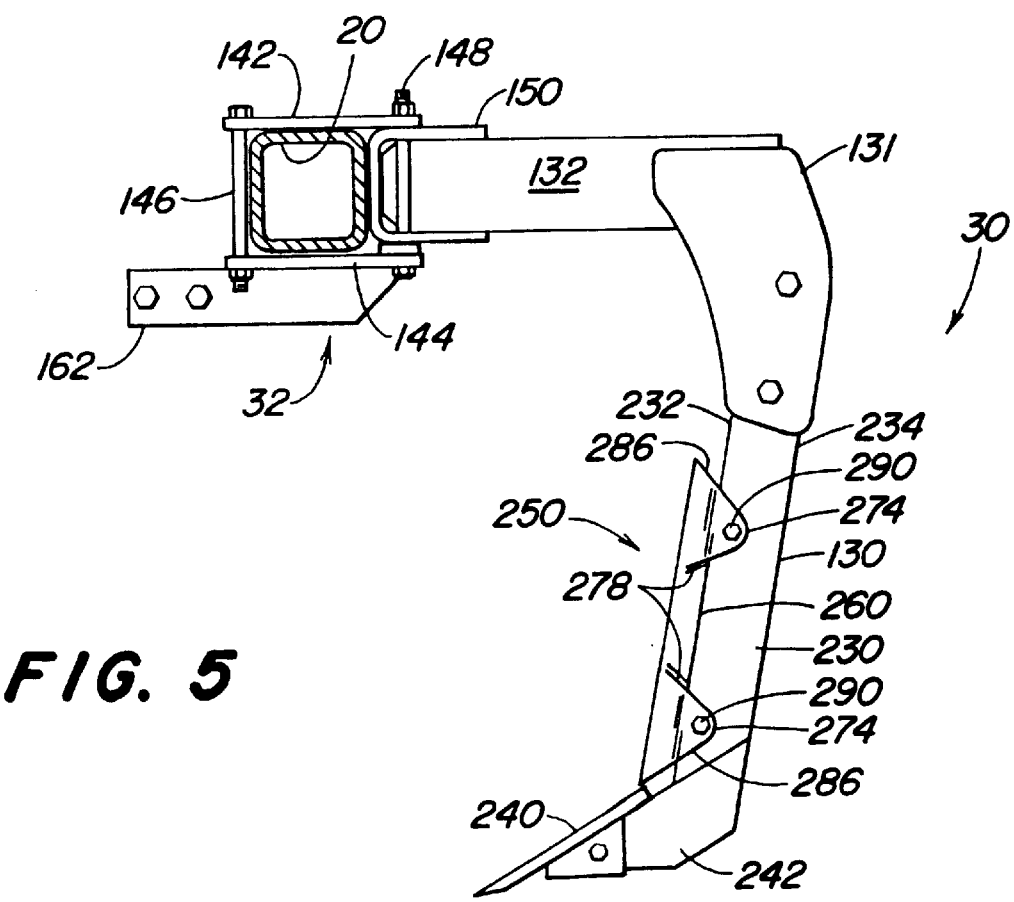
FIG. 5 is a side view of the ripper standard assembly.

The wear shin 250 includes a leading, narrow shin edge 252 which is rounded (FIGS. 8 and 9). Forwardly and outwardly concave sides 254 extend rearwardly from the shin edge 252 to outermost sides 260 that extend along a major portion of the front edge 232 (FIGS. 5 and 9). Aft facing walls 264 extend inwardly from the sides 260 to central void 266 and abut the front edge 232 for solid contact of the shin 250 against the front edge 232 the entire length of the shin.

Pairs of apertured attaching ears 274 extend rearwardly from the top and bottom portions of the shin 250 and are transversely spaced a distance approximately equal to but slightly greater than the spacing between the shank sides 230 to embrace the sides when the shin 250 is positioned against the leading edge 232 of the shank. The ears 274 flare outwardly from a central area of the main body of the shin 250 at locations 278 and extend rearwardly to aperture locations 284. End-most extremities 286 of the ears 274 converge in the rearward direction towards the locations 284. Bolts 290 extend through the apertures at 284 and through corresponding apertures in the shank 130 to firmly secure the shin 250 in position. As seen in FIG. 5, the lower, end-most extremity 286 extends directly above the tooth 240 and generally along a plane defined by the upper surface of the tooth.

The shin 250 is substantially symmetrical so that it may be reversed top to bottom on the shank 130 for more even wear and longer total wear life. Preferably the shin is fabricated from a high chrome cast alloy, for example, ASTM A532, for added wear life.

In operation, as the shank is lowered into ground engagement and moved forwardly, the leading edge 252 shears through the soil and trash. The concave sides 254 provide an increasing rate of soil movement from the edge 252 to the leading edge 232 of the shank 130 to accelerate the soil and trash outwardly around the side walls 230 of the shank in a manner somewhat similar to that provided by a plow share. The above-described shape provides lower penetrating and draft force requirements and increased wear life.

Having described the preferred embodiment, it will become apparent that various modifications can be made without departing from the scope of the invention as defined in the accompanying claims.

We claim:

1. A wear shin for an upright shank of a tillage implement adapted for forward movement through soil, the shank having shank sides spaced a preselected distance apart and joined by a leading front edge, the wear shin comprising:

a shin body having a leading shin edge, outwardly concave sides extending rearwardly from the shin edge to outermost sides, and connecting structure releasably securing the shin body to the shank, wherein the shin edge is spaced a second distance from the shank sides, the second distance being substantially greater than the preselected distance so the concave sides provide soil acceleration along the second distance that increases from the leading shin edge towards the shank to move soil outwardly around the shank sides as the shank moves forwardly through the soil.

2. The wear shin as set forth in claim 1 wherein the outermost sides are coextensive with the shank sides.

3. The wear shin as set forth in claim 2 wherein the shin includes opposite ends having rearwardly extending ears adapted to embrace the shank sides at upper and lower portions of the shank.

4. The wear shin as set forth in claim 3 wherein the outermost sides of the shin body are generally parallel with the shank sides.

5. The wear shin as set forth in claim 4 wherein the ears flare outwardly from the outermost sides of the shin body and wherein the wear shin has a profile, looking from the forward direction of movement, which is generally coextensive with the shank sides except for areas where the ears extend rearwardly to embrace the shank.

6. The wear shin as set forth in claim 1 wherein the wear shin is generally symmetrical about a central section so that the shin is reversible on the shank.

7. The wear shin as set forth in claim 1 wherein the shin is fabricated from chrome alloy.

8. In a tillage implement having a frame adapted for movement in a forward direction over the ground, a shank assembly including a planar shank having shank sides facing in outward directions and spaced a preselected distance apart, the shank sides joined by an upright leading front edge and defining a shank profile, a wear shin having a leading shin edge and shin faces extending rearwardly and outwardly from the shin edge to outermost sides, the shin faces defining a shin cross section which is concave in the forward and outward directions, wherein the leading shin edge is offset forwardly from the upright leading front edge a second distance greater than the preselected distance to provide outward soil acceleration that increases gradually along the second distance from the leading shin edge towards the shank to move soil outwardly around the shank sides as the shank moves forwardly through the soil.

9. The shank assembly as set forth in claim 8 wherein the outermost sides are substantially parallel to and aligned with the shank sides to thereby present a profile comparable to the shank profile as the frame moves forwardly.

10. The shank assembly as set forth in claim 9 wherein the shank includes a lowermost tool-supporting end and an uppermost connecting end, and wherein the shin extends upwardly from the tool-supporting end to a location adjacent the upper connecting end.

11. The shank assembly as set forth in claim 10 wherein the shin has first and second similar ends and is reversible on the shank with either the first or second end positioned adjacent the tool-supporting end.

12. The shank assembly as set forth in claim 11 wherein the shin includes connecting ears extending rearwardly from the first and second ends and embracing the shank sides.

13. The shank assembly as set forth in claim 10 wherein the leading edge of the shank is planar, and wherein the shin includes rear wall structure abutting the leading edge of the shank substantially the entire length of the shank.

* * * * *